No. 856,894. PATENTED JUNE 11, 1907.
I. S. MERRELL.
CORN SILKING MACHINE.
APPLICATION FILED JUNE 26, 1905.
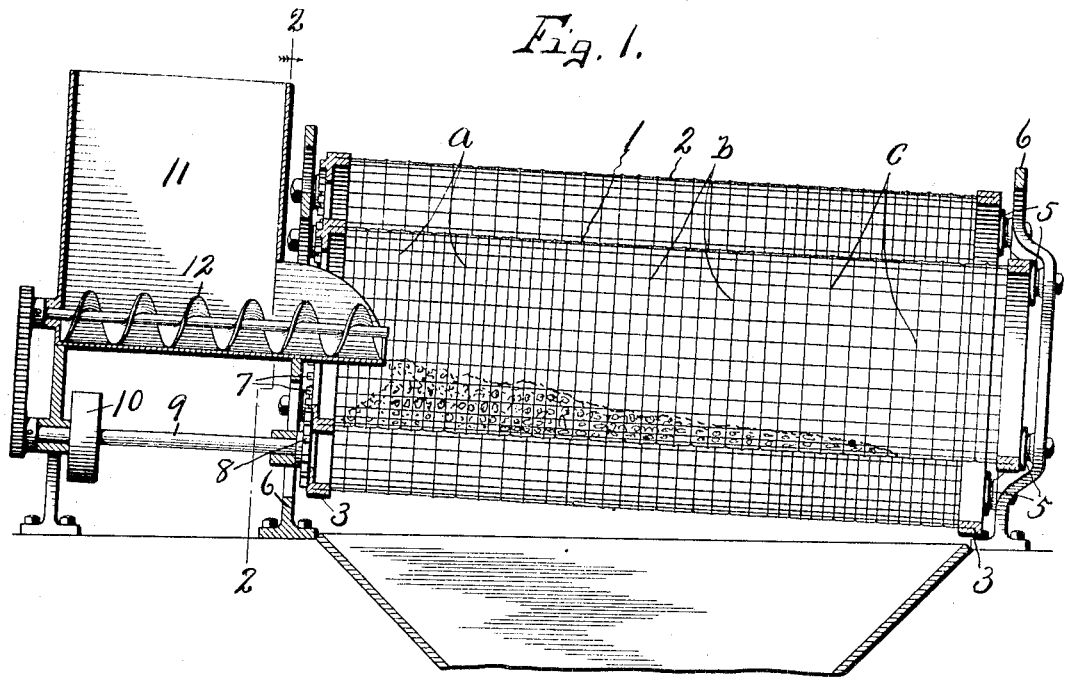
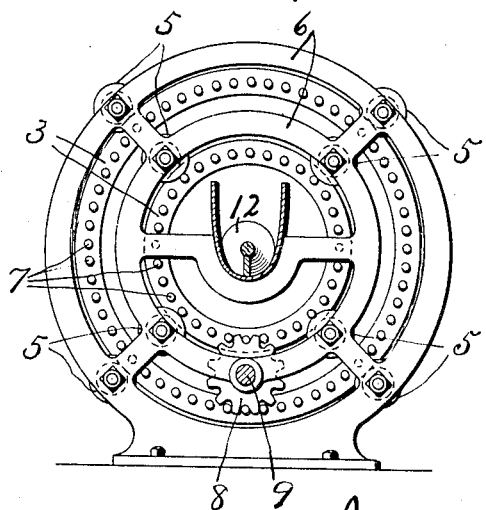
WITNESSES:
B. E. Robinson
H. E. O'Hare
INVENTOR
Irving S. Merrell
BY
Howard P. Denison
ATTORNEY.

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

CORN-SILKING MACHINE.

No. 856,894.     Specification of Letters Patent.     Patented June 11, 1907.

Application filed June 26, 1905. Serial No. 267,106.

*To all whom it may concern:*

Be it known that I, IRVING S. MERRELL, of Syracuse, in the county of Onondaga, in the State of New York, have invented new and useful Improvements in Corn-Silking Machines, of which the following, taken in connection with the accompanying drawings, is a full, clear, and exact description.

This invention relates to improvements in corn silking machines of the class set forth in the patent to G. S. Merrell No. 419,696, January 21, 1890, in which the corn, after being cut from the cob with more or less silk adhering thereto, is fed into a rotary screen-cylinder having its meshes of uniform size from end to end for the purpose of separating the silk from the corn and allowing the corn to gravitate or sift through the meshes and into an underlying hopper or receptacle while the silks become entangled and collect upon the wires of the screen to be removed as often as may be necessary. I have found, however, that when the meshes are of the same size from end to end of the screen and sufficiently large to permit the corn to pass readily therethrough the efficiency of the machine is materially lessened by reason of the fact that the raw material, which is somewhat viscous and sluggish becomes congested at the point of delivery onto the screen, and that this excessive bulk at one point causes the corn to be crowded or forced through the meshes together with more or less of the silks before the mass can be properly spread out or distributed along the inclined bottom and sides of the screen. This not only allows much of the silk to pass through the meshes with the corn, but unduly limits the working area of the screen to that portion upon which the material is first deposited.

The main object, therefore, of my present invention is to increase the working-area and general efficiency of the screens and to enable the silks and corn to be more quickly and easily separated and at the same time to break up any bunches of kernels which may cling to each other as cut from the cob after being delivered into the screen.

A further object is to more effectively separate the larger pieces of cob which may have been mingled with the corn when introduced into the screen. This is accomplished by gradually increasing the size of the meshes from the inlet to the outlet end of the inner screen-cylinder, making those at the inlet end of substantially the size of the kernels of corn and then slightly increasing the size of the mesh toward the low end of said cylinder.

So far as the practical operation of my improved corn-silking machine is concerned I may use a single cylinder of sufficient length to produce the desired result, but as it is necessary to frequently remove these screens by hand for the purpose of removing the accumulated silks and other refuse, I preferably use two concentric cylinders, which are comparatively short and easily handled, and in such case the meshes of the outer screen cylinder are gradually increased from the low discharge end toward the inlet end of the inner screen, making the smaller mesh of substantially the same size as or slightly larger than the kernels of corn, or about the size of the small mesh of the inner screen, while the remaining meshes are somewhat larger to permit the corn to pass easily therethrough. It is now apparent that the portion of the outer screen having the small mesh surrounds the portion of the inner screen having the larger mesh so that any kernels which may reach the larger mesh of the inner cylinder will pass through the smaller mesh of the outer cylinder leaving the silks on one or the other of the screens, and at the same time if any large pieces of cob larger than the kernels of corn escape through the large mesh they will be caught in the smaller meshes of the larger screen, and subsequently discharged through the open end of the latter screen separate from the corn.

In the drawings, Figure 1 is a longitudinal vertical sectional view of a corn silking-machine embodying the features of my invention. Fig. 2 is a transverse vertical sectional view taken on line 2—2, Fig. 1, showing particularly the supporting frame and driving means for the screens.

In carrying out the objects stated, I provide two rotary concentric cylinders —1— and —2— with comparatively stiff end-rings or bands —3— for reinforcing and maintaining the form of the cylinders, which latter are supported in an inclined position upon suitable rollers —5— of fixed supporting standards —6— located at the ends of the cylinders —1— and —2—, the rings —3— forming convenient tracks which ride upon the rollers —5—. The ring —3— at the high end of the cylinders —1— and —2— are also concentric and disposed in substantially the same transverse plane and are each provided with a circular row of pins or teeth —7—, which are caused to mesh with a pinion —8— on a suitable driving shaft —9— having a driving pulley —10— adapted to be connected by a belt, (not shown) to any available source of power for driving the shaft —9—, and thereby transmitting rotary motion to the cylinders —1— and —2—.

The green corn, after being cut from the cob, is placed in a suitable hopper —11—, and is then fed by means of a screw —12— into the open high end of the inner cylinder —1—, where it falls upon the finer meshes of said cylinder, and is thereby carried upwardly and forwardly and agitated more or less by the rotation of the cylinder for the purpose of spreading or distributing the material lengthwise of the screen and over as large an area as possible. Portions of the corn deposited upon the finer mesh of the inner cylinder will readily pass through such mesh, leaving more or less of the silk entangled in the wires and if any silks should still adhere to the corn while passing through the finer mesh of the inner screen it will be very liable to catch upon the wires of the larger meshes of the outer screen immediately surrounding the finer meshes of the inner screen, because the corn will have a freer passage through the larger meshes of the outer screen and permit the projecting ends of the silk to more readily catch upon the coarser mesh of said outer screen while the corn is passing therethrough, it being understood that there is considerable space intervening between the inner and outer screen through which the corn must pass and that the continuous rotation of the cylinders causes the corn to tumble about more or less before passing through the outer screen, thereby insuring a more certain separation of the silk from the corn. As the corn in the inner cylinder is tumbled about it is simultaneously fed forward owing to the inclination of said cylinder which causes the material to feed upon the succeeding enlarged meshes, through which the corn is sifted with gradually increased freedom, as the material approaches the lower end or coarser meshes of the inner cylinder, such coarser meshes being somewhat larger than the largest kernels of corn to insure the free passage of said corn therethrough and onto the surrounding finer meshes of the outer cylinder before reaching the extreme low end of the inner cylinder.

It will now be seen that by making the meshes of the screen —1—, upon which the raw material is first deposited, of just sufficient size to permit the kernels of corn to pass easily therethrough, and then gradually increasing the size of the meshes toward the low end of the cylinder, the screening of the corn through the inner screen is slightly retarded, while at the same time it is being fed forward onto the next coarser meshes and is thus gradually distributed along nearly the entire length of the inner screen, but gradually falls through the screen with gradually increasing freedom from the inlet toward the low end of the screen.

It sometimes happens that several kernels of corn, as cut from the cob, will cling or adhere to each other, thus forming a bunch of kernels which must be separated before they can pass through any of the meshes, except the larger ones at the lower end of the inner cylinder, and if they are not broken apart before reaching the larger meshes they will immediately fall upon and be further agitated by the finer meshes of the outer screen, which immediately surround the coarser meshes of the inner screen, and upon which these bunches are tumbled until separated, whereupon the kernels fall readily through the finer meshes of the outer screen.

There is always more or less broken cob of various sizes mixed with the material and if too large to pass through the larger meshes at the low end of the inner screen they are discharged through the open end of such screen, but any such pieces of cob passing through said coarser meshes of the inner screen are caught upon the surrounding finer meshes of the outer screen and are finally ejected through its open low end separate from the corn.

It will now be seen that the inner cylinder is provided with different sizes of meshes —a—, —b— and —c—, the meshes —a— being nearest the inlet end and of just sufficient size to permit the kernels of corn to pass easily therethrough, while the meshes —b—, next adjacent thereto are slightly larger to permit the kernels of corn to pass therethrough with greater freedom and the next succeeding meshes —c— are still larger and permit the screening of the corn therethrough with still greater freedom so that the size of the meshes gradually increase as the material is gradually spread out and this spreading out of the material over the meshes of gradually increasing size facilitates the separation of silks from the corn for the reason that the mere contact of the silks with the wires of the screen causes them to loop around and cling to said wires while the kernels drop freely away from the silks without pressure, particularly when passing through the larger meshes.

In operation, the raw material is fed by the screw —12— upon the finer meshes —a— of the cylinder —1— and during the rotation of this cylinder some of the corn, of course, will feed through these fine meshes and carry some of the silk with it, both falling into the surrounding larger meshes of the outer screen —2—, which allows the free corn to pass easily therethrough, but if any silk should adhere to the kernels it will probably, and most always, catch or loop upon or around the wires of the coarser outer screen, thereby freeing itself from the kernels of corn which readily pass through the screen and into an underlying hopper or receptacle shown in Fig. 1. As these screens continue to rotate the material is fed forwardly toward their low ends and at the same time is tumbled about therein, thus separating and spreading the corn out along the length of the cylinders and allowing the kernels to gravitate easily through the larger meshes while any silks which may be free or adhering to said kernels are caught upon the wires and retained thereby, while the kernels pass freely through both screens and into the underlying receptacle, the pieces of cob which may be larger than the kernels of corn being discharged through the open ends of the cylinder separate from the corn.

What I claim:

1. In a corn silking machine, two concentric rotary and inclined screen cylinders arranged one within the other, the meshes at the higher end of the inner cylinder being finer than those at the lower end, and the meshes at the higher end of the outer cylinder being coarser than those at the lower end, and means to rotate said cylinders.

2. In a corn-silking machine, a rotary screen cylinder having a portion thereof of comparatively fine mesh, and another portion thereof, of comparatively coarse mesh, a second rotary screen cylinder, having a portion thereof of comparatively coarse mesh inclosing the fine mesh portion of the first named screen and also having a fine mesh portion surrounding the coarse mesh portion of said first named screen.

In witness whereof I have hereunto set my hand this 15th day of June, 1905.

IRVING S. MERRELL.

Witnesses:
HOWARD P. DENISON,
MILDRED M. NOTT